United States Patent
Kennedy

[15] 3,694,609
[45] Sept. 26, 1972

[54] METHOD AND APPARATUS FOR INDUCTIVE HEATING
[72] Inventor: Leo J. Kennedy, Toledo, Ohio
[73] Assignee: Owens-Illinois, Inc.
[22] Filed: Feb. 1, 1971
[21] Appl. No.: 111,479

[52] U.S. Cl..............................219/10.79, 219/10.53
[51] Int. Cl...............................................H05b 9/02
[58] Field of Search.........................219/10.79, 10.53

[56] References Cited
UNITED STATES PATENTS

| | | | |
|---|---|---|---|
| 2,353,130 | 7/1944 | Dravnek | 219/10.79 |
| 3,100,250 | 8/1963 | Herczog et al. | 219/10.79 X |
| 3,275,784 | 9/1966 | Merrett | 219/10.79 |
| 2,666,831 | 1/1954 | Seulen et al. | 219/10.79 X |

Primary Examiner—J. V. Truhe
Assistant Examiner—Hugh D. Jaeger
Attorney—Philip M. Rice and E. J. Holler

[57] ABSTRACT

Method and apparatus for exercising effective electromagnetic influence across an entire planar surface of an electrically conductive object to inductively heat the planar surface when the dimensions of the planar surface exceed the effective limits of a field provided by opposite runs of an inductive heating coil. The method and apparatus is particularly applicable to sealing wide-mouth containers by bonding across and to the container finish a closure member. An assembly of the closure member, thermoplastic bonding material and the container finish is conveyed in a linear direction past the novel inductive heating coil. The heating coil acts to shift the effective magnetic influence of the coil across the path without physically moving the coil. Novel structures of inductive heating coils are also disclosed.

19 Claims, 8 Drawing Figures

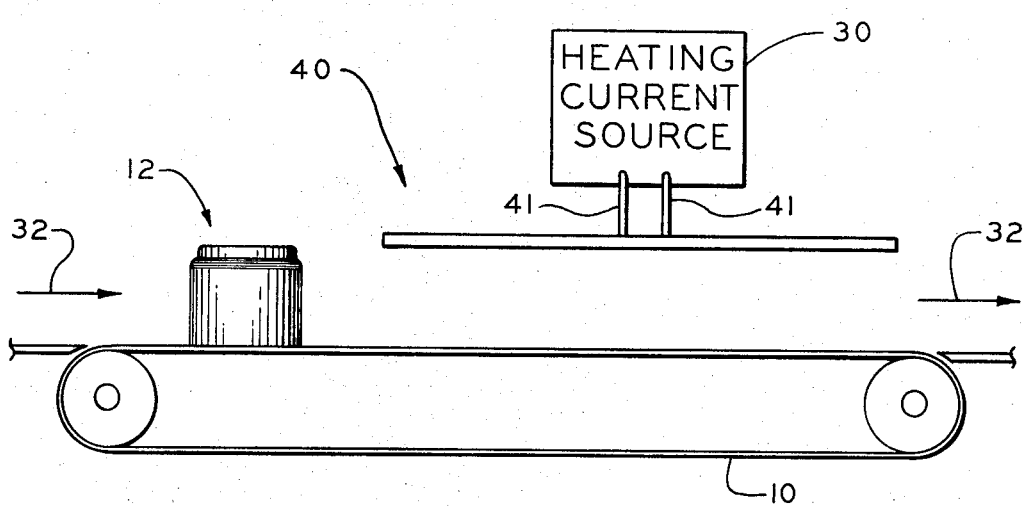
FIG. 1
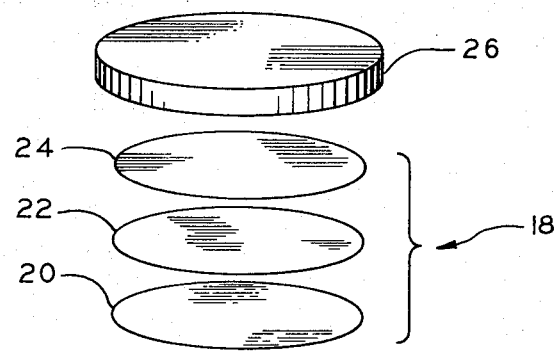
FIG. 2
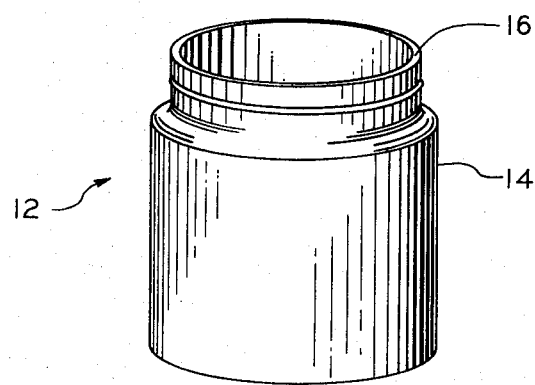
INVENTOR
LEO J. KENNEDY

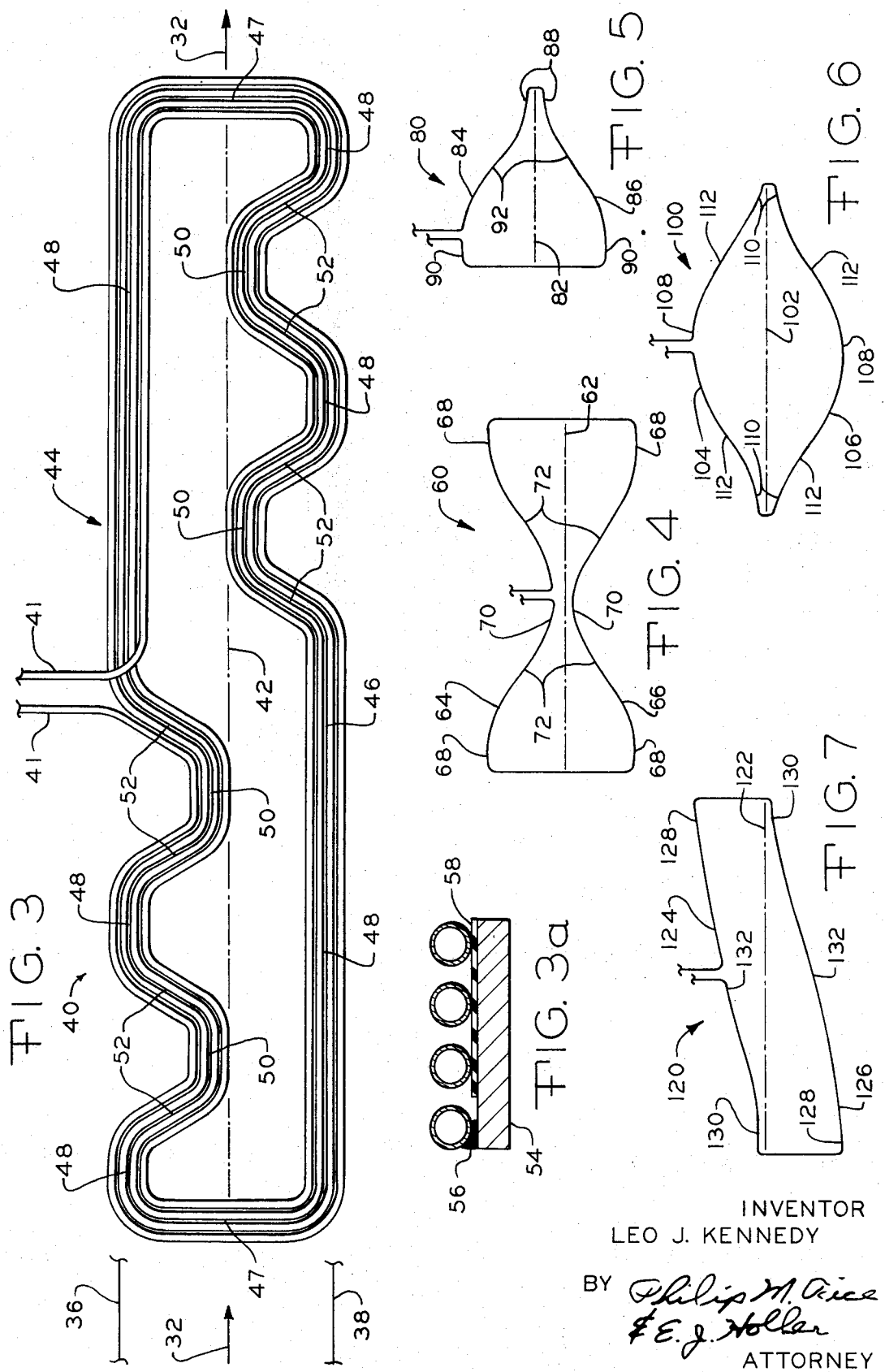

METHOD AND APPARATUS FOR INDUCTIVE HEATING

BACKGROUND OF THE INVENTION

In packaging or bottling materials it is frequently desirable to effect positive hermetic sealing of the receptacle or container. Such sealing is particularly required in cases where the packaged material deteriorates upon exposure to air or moisture, or is of a corrosive, toxic, flammable or explosive nature.

In the past a hermetic seal was attempted by the crimping of metal foils to metallic tins or cans but this method had disadvantages in filling and the seal was not always perfectly hermetic. Closure caps with waxed pulpboard pads or wads were tried to which were lightly heat-sealed double glassine membranes. The pads were first made adhesive by passing them under glue-coated rollers. The caps were then applied to the containers and after the adhesive has had time to dry out, the caps were unscrewed and the membranes part from the waxed pads and remain adhered to the finishes of the containers. In this instance the adhesive takes some time to dry and during this period water vapor is absorbed by the contents of the container. Moreover it was difficult for the efficiency of the operation to be inspected at the end of the packing line.

More recently sealing has been effected by completely fusing a thermoplastic membrane to a container of thermoplastic material by an inductive heating method, as disclosed in U. S. Pat. No. 2,937,481. In most instances this sealing method is too drastic since the seal cannot be broken without damaging or distorting the container neck and thus makes re-sealing or re-use difficult.

The membrane sealing process has been further refined so that a process for applying a sealing membrane to a container has been developed wherein either the membrane or the container or both is of metal. This method is disclosed in U. S. Pat. No. 3,460,310. The membrane is placed under sealing pressure onto the container finish and the metal of the membrane or container finish is heated by means of an induced radio frequency current to a temperature sufficient to soften a thermoplastic material coated on the material of the membrane whereby the membrane is removably adhered to the container without distortion of the container.

The last described method of sealing containers is the most satisfactory developed to date. However, the induction heating methods utilized require either a stop-and-go type of packaging line or limit the size of the container finish being sealed to small mouth containers not exceeding approximately one and one-half inches in diameter. These disadvantages occur because the inductive heating coils presently inown in the art are not able to exercise effective electromagnetic influence on the entire planar surface of a metallic foil membrane when the membranes are moved continuously past the inductive heating coil when they exceed approximately one and one-half inches in diameter. This is true because when the opposite sides or runs of the inner turns of an inductive heating coil are separated beyond a certain limit the central portion of a metallic susceptor passing beneath the coil does not receive effective electromagnetic influence and thus is not heated to activate the thermoplastic bonding material.

To overcome this problem a series of wide-mouth containers are continuously sealed by rotating each container as it passes beneath an elongated load coil so that the entire periphery of the container finish is exposed to the effective electromagnetic influence of the coil during the rotation. Rotation of filled containers may disturb or spill the contents, is difficult with flexible plastic containers, introduces more costly equipment for maintenance and is not as fast as desired. Alternatively, a stop-and-go motion is used in which the container is momentarily halted and a load coil having a diameter substantially the same as the container finish is moved into inductive heating relationship therewith to effect the seal. This sharply limits the speed of operation of a filling and packaging line.

Accordingly, it is an object of this invention to provide an improved method and apparatus for packaging.

Another object of this invention is to provide an improved method and apparatus for exercising effective electromagnetic influence across an entire planar surface of an electrically conductive object to inductively heat the planar surface when the dimensions of the planar surface exceed the effective limits of a field provided by opposite sides of an inductive heating coil when current is flowing therethrough.

It is a still further object of the present invention to provide method and apparatus for applying membranes, both metallic and non-metallic, to wide-mouth containers, also metallic or non-metallic, which will give a hermetic gas-tight seal, and which may be effected on continuously moving containers.

SUMMARY OF THE INVENTION

The above objects are carried out in a preferred embodiment for practicing the invention which features a method of exercising effective electromagnetic influence across an entire planar surface of an electrically conductive object by moving the planar surface of the object in a linear direction to define a path, and forming an inductive heating coil having at least one elongated turn which defines a plane, the elongated turn having a major axis. The elongated turn is disposed so that the plane defined thereby is an inductive heating relationship with and substantially parallel to the movement of the planar surface along the path, and so that the major axis of the elongated turn is substantially parallel with the direction of movement of the planar surface. First and second runs of the elongated turn are extended generally longitudinally respectively along first and second sides of the major axis. The effective magnetic influence of the first and second runs is shifted across the path by disposing one portion of each run adjacent the major axis, disposing another portion of each run adjacent the respective outer edge of the path, and connecting two portions of each run with a third portion extending obliquely with respect to the major axis. When inductive heating current is flowed through the coil and the planar surface is moved through the path adjacent the coil the effective magnetic influence is shifted transversely across the planar surface as it moves through the path to effectively heat the entire planar surface.

Other objects, advantages and features of this invention will become apparent when the following description is taken in conjunction with the accompanying drawings, in which:

FIG. 1 is a side elevational view of apparatus embodying the teachings of this invention;

FIG. 2 illustrates a wide-mouth container and closure arrangement which may be utilized in practicing this invention;

FIG. 3 is a plan view of a first embodiment of a novel inductive heating coil for practicing this invention;

FIG. 3a is a cross-sectional view of an alternate embodiment of the coil illustrated in FIG. 3; and FIGS. 4, 5, 6, and 7 illustrate diagrammatically plan views of other embodiments of inductive heating coils illustrating the teachings of this invention.

DESCRIPTION OF THE PREFERRED EMBODIMENTS

By means of the process of this invention, metallic or non-metallic membranes may be applied to metallic or non-metallic containers, provided that either the membrane or the container is metallic. The process of the invention may be used to apply a metal membrane to a metal container, a glass container, a ceramic container, or a synthetic plastic container.

When the container is of metal and the membrane applied thereto is of metal, either the membrane or the finish of the container may have the coating of thermoplastic bonding material. When the membrane and the finish of the container are heated by the induced current from the inductive heating coil the thermoplastic bonding material softens sufficiently to adhere the membrane to the container.

When the metal membrane is applied to a glass or synthetic plastic container, either the membrane or the finish of the container may have the coating of thermoplastic bonding material. In the case of a synthetic plastic container, to avoid distortion of the container, the thermoplastic coating must have a melting point lower than the material of the container. By means of the invention membranes of non-metallic material may be applied to metal containers. For instance, a paper membrane may be applied to a metal container by applying to the membrane or the finish of the container the thermoplastic heat sealing coating. As before, this coating softens sufficiently to adhere the membrane to the container when the container finish is heated by the induced current therein. A thermoplastic membrane may be applied to a metal container and here it is not absolutely necessary, although it may be sometimes desirable, to use a coating of thermoplastic adhesive.

Normally, containers provided with sealing membranes are also provided with closure caps, although this is not always necessary. The closure caps may also be provided with resilient wads such as pulpboard or composition cork wads. Basically there are two types of closure caps for use for such containers as the present invention involves, and these may be classified broadly as the "snap-on" type and the "screw-on" type. The screw-on type may have a continuous lip for engagement with a corresponding thread on a container neck. The screw-on type caps may be formed of a metal, synthetic thermosetting materials, and synthetic thermoplastic materials. The snap-on type caps are normally formed from metal or flexible plastic material, but can be formed of paper.

When a screw-on plastic closure cap is used, the cap may be fitted with a resilient wad in the metal foil membrane. The cap may then be screwed onto the container to develop sealing pressure on the membrane or to hold the membrane and the container finish in sealing contact with the thermoplastic bonding material, after which current will be induced in the foil membrane. It is possible for the resilient wad and the metal foil membrane to be formed as a unitary article. A sheet of wad material may be stuck to a sheet of metal foil and then discs may be cut from the laminate so formed.

When a snap-on plastic or paper closure cap is used, the cap and the membrane may be all applied to the container at the same time. The sealing members may be metallic or non-metallic. Metallic foils of aluminum or tin make good membranes. Non-metallic membranes may include those made from paper, glassine, polyethylene and the like.

The thermoplastic coating may be of a resin, a natural or synthetic wax, a synthetic thermoplastic material such as polyester, or the like. The thermoplastic material may be coated on the whole of the underside of the membrane, or it may be coated in the form of an annular ring on the periphery thereof.

Plastic containers to which membranes may be sealed by means of the present invention include any of the synthetic plastic materials, but which materials preferably have a higher melting point than the material used for the thermoplastic bonding coating.

Referring to FIG. 1 there is illustrated a continuously running conveyor 10 for moving a wide-mouth container assembly 12 in a linear direction 32 beneath an inductive heating coil 40 which is connected via terminals 41 to a current source 30.

Referring to FIG. 2 there is illustrated an exploded view of a container assembly 12. A container 14 has an upwardly extending finish 16. A laminated disc closure member preferably comprises a membrane which includes a thermoplastic bonding material layer 20 and a metallic foil susceptor layer 22. A support layer of kraft paper or synthetic plastic material or the like may be provided if the metallic foil susceptor is not of a strength or thickness to properly retain the contents of the container 14. The support layer 24 thus may be made of a material which is sufficiently strong to enable use of the disc closure member 18 without a cap such as illustrated at 26.

The cap 26 may be of a screw-on or, preferably, a snap-on type of closure which functions to protect the disc closure member 18 and/or to maintain the thermoplastic bonding layer 20 in sealing contact with the finish 16 and the susceptor layer 22. Alternatively, other means may be utilized to maintain the sealing relationship between the disc closure 18 and the finish 16. For example, an endless belt may be used having a lower run extending beneath the inductive heating coil 40 to press downwardly upon disc 18 and a return run which may be disposed above the inductive heating coil 40. Such an endless belt would be made of non-metallic material to prevent interference with the exercise of effective electromagnetic influence therethrough to heat the susceptor 22.

It should also be recognized that although the use of a unitary membrane or disc 18 as described above is preferable, this invention can also be practiced by utilizing a closure member, a thermoplastic bonding material between the closure member and the container finish, and a separate metallic susceptor disposed in conductive heating relationship with the thermoplastic coating while being passed in inductive heating relationship with the coil 40.

Referring now to FIG. 3 there is illustrated a plan view of the inductive heating coil designated generally at 40. Terminals 41 and the turns of the coil 40 are preferably formed from copper tubing which circulates water to cool the coil 40 in addition to carrying the inductive heating current supplied by the current source 30. As can be seen in FIG. 3 the linear direction of the container assembly 12 generally, and in particular of the metallic susceptor 22, is indicated by the arrows 32. While the direction of movement in this instance is rectilinear, curvilinear movement of the container assembly 12 is within the scope of this invention, the configuration of the coil 40 being modified accordingly to accommodate the type of linear movement.

The path of the susceptor 22 is illustrated by showing the outer edges 36, 38 of the path. It will be noted that the linear direction 32 of the susceptor 22 is substantially parallel with the major axis 42 of the coil 40.

The copper tubing conductor of coil 40 forms at least one elongated turn which defines a plane for disposition in inductive heating relationship adjacent and substantially parallel to the path defined by movement of the planar susceptor 22 in the linear direction 32. The elongated turn includes first and second runs 44, 46 connected by crossover runs 47. The first and second runs 44, 46 extend generally longitudinally along and on first and second sides of the major axis 42, respectively.

Each of the first and second runs 44, 46 has portions 50 positioned sufficiently close to the major axis 42 to permit the exercise of effective electromagnetic influence, when current is passing therethrough, on the path and thus the susceptor 22 when adjacent the major axis 42. The portions 50 do not exercise effective electromagnetic influence on the outer edges 36, 38 of the path nor on the outer edges of the susceptor 22.

Each of the first and second runs 44, 46 has other portions 48 spaced from the major axis 42 to permit the exercise of effective electromagnetic influence, when current is passing therethrough, on the respective outside edges 36, 38 of the path. The portions 48 do not exercise effective electromagnetic influence on that part of the path or the susceptor adjacent the major axis 42. The portions 48, 50 of each of the first and second runs are connected by a plurality of third portions 52 which extend generally obliquely with respect to the major axis 42 to permit the exercise of effective electromagnetic influence generally obliquely across the path between that part adjacent the major axis 42 and the respective outside edges 36, 38.

The inductive heating coil 40 may thus be defined as having a first run starting adjacent one outside edge of the path 34 and includes at least one excursion obliquely toward and then away from the major axis, and a second part which extends generally adjacent the one outside edge. The second run comprises one part opposite the one part of the first run which extends linearly adjacent the outside edge of the path, and a second part which is opposite to the second part of the first run and starts adjacent the other outside edge and includes at least one excursion obliquely toward and then away from the major axis. The first and second runs of the coil 40 each further include linearly extending sections 50 adjacent the major axis 42 connecting the inner reaches of each excursion of the oblique portions 52.

When a wide-mouth container fitted with a laminate closure 18 is passed in the direction 32 beneath the coil 50, the portions 48 of the coil 40 will effect an electromagnetic influence on the outside edges of the laminate 18 to activate the thermoplastic material 20 to bond to the finish 16 of the container. The oblique portions 52 of the coil 40 and the portions 50 at the inner reaches of the excursions defined by the oblique portions 50 will effectively shift the electromagnetic influence toward and away from the major axis 42 of the coil 40 to induce current flow and thus heat in the central portion of the susceptor 22. This heat is conducted to the central portion of the thermoplastic layer 20 to activate the thermoplastic material to effect a bonding of the remainder of the perimeter of the laminate 18 to the finish of the container 16.

Thus, the shifting of the electromagnetic influence from specific areas of the laminate to other specific areas of the laminate in succession for the length of the coil provides hermetic sealing of a container while it is in constant linear motion, enabling rapid and effective sealing of wide-mouth containers.

When alternating electric current flows in a conductor, a symmetrical electromagnetic field is established around the conductor. If the conductor is formed into a loop or coil, the alternating magnetic field is intensified. The actual intensity is determined by the magnitude of the current flowing through the coil and the number of turns in the coil. When more than one turn is utilized in a coil the magnetic field is distorted to provide areas of maximum electromagnetic influence.

The resistance offered by the work piece to the flow of the induced current produces heat in it proportional to the electrical resistivity of the workpiece and to the square of the current flowing. Thus, any metal part or other conductive material placed adjacent a coil energized with alternating electric current heats without physical contact between the part and the coil. The current flowing through the coil and the spacing between the coil and the workpiece determines the amount of induced current in the workpiece and thus the amount and location of the heating. Thus the design of a coil with respect to the number of turns and the magnitude of the current flowing therethrough and the spacing of the workpiece are all to be considered when working with inductive heating. In this instance the design must insure sufficient heat in the susceptor to conductively activate the thermoplastic bonding material without scorching, melting or otherwise damaging the laminate. The characteristics of the foil and the bonding material are considered along with the speed of a container being passed by the coil to effectively seal a membrane as disclosed to the container finish without damaging the laminate.

The embodiment of the coil illustrated in FIG. 3 has been used experimentally to effectively activate a polyester bonding material to seal the finish of a polyethylene container to an aluminum foil susceptor which has a backing of kraft paper. This has been accomplished without scorching or otherwise damaging any portion of the laminate and while effecting a hermetic seal on containers having a finish diameter of five inches at conveying speeds which process more than 150 containers per minute.

Thus, when a cap 26 is utilized a finished package is provided which has a tamper proof seal, a hermetic seal, and a re-seal capability. Moreover, the configuration of the container finish is immaterial with the method and apparatus disclosed herein. That is, the top of the container finish may be circular as shown, square, triangular, rectangular, with a pour spout or with other special purpose configurations designed into the final shape.

While the configuration and shape of the inductive heating coil illustrated in FIG. 3 is primarily concerned with laminate closure sealing as hereinbefore described, it is to be recognized that the principles disclosed for this method and apparatus can be utilized to effectively and selectively inductively heat the planar surface of any conductive material being passed adjacent the coil 40.

The coil illustrated in FIG. 3 may be utilized as shown with the maximum electromagnetic influence of the coil being concentrated adjacent the inside turn of the coil. However, the magnetic field may be further distorted to shift the maximum area of effective influence and/or to distribute the electromagnetic field. Referring to FIG. 3a there is shown an embodiment in which a single turn, metallic sheath secondary 54 is brazed at 56 to the inner turn of the coil 40. The copper bar inductor 54 extends around the turns of the coil between the coil and the path 34. The inductor 54 is insulated from all but the inner turn by air or insulation as indicated at 58. The copper bar inductor 54 is split, for example adjacent the input terminals to the coil 40, to prevent the induction of circulating currents therein. The inductor 54 distorts the electromagnetic influence of the plurality of turns of the coil 50 to move the maximum region of electromagnetic influence more toward the outside of the coil and to distribute the electromagnetic influence more evenly, thus permitting a more generalized inductive heating effect rather than localized in a maximum electromagnetic influence area.

Referring to FIGS. 4, 5, 6, and 7 there are shown alternate embodiments of inductive heating coils utilizing the principles disclosed herein and illustrating alternate coil configurations. The coils represented in FIGS. 4 through 7 are diagrammatically illustrated as single turn coils as viewed from above to show the configurations required with the greatest clarity. The number of turns in each coil will be determined by the specific job requirements.

The coil 60 in FIG. 4 has a major axis 62 with a first run 64 and a second run 66 extending longitudinally along the major axis. Portions 68 of the coil 60 are disposed adjacent the path edge while portions 70 are disposed adjacent the major axis. Portions 68 and 70 are connected by oblique portions 72 enabling coil 60 to perform the function of shifting the electromagnetic influence with respect to a planar metallic surface passing along major axis 62.

The coil 80 of FIG. 5 has a major axis 82 with a first run 84 disposed on one side of the axis 82 and a second run 86 disposed on the other side of axis 82. Portions 88 are disposed adjacent path edges while portions 90 are disposed adjacent the major axis 82. Oblique portions 92 connect portions 88 and 90 to effect a shifting of the electromagnetic influence across the path.

The bow-tie or sandglass configuration of FIG. 4 may be utilized to shift the electromagnetic influence over all areas of a container finish twice to insure sealing. The half sandglass configuration in FIG. 5 may be utilized when a double sealing effect is not required. Either of the configurations of FIGS. 4 and 5 may be utilized when it is desired to initiate the sealing on the outside edges of a container finish and terminate the sealing on the central portions of the container as it passes along the path.

In the coils of FIGS. 4 and 5 the first and second runs each start adjacent their outside edge of the path and continue obliquely inwardly toward each other and the major axis until the major axis is under effective electromagnetic influence. In the coil of FIG. 4 the first and second runs continue from their innermost position obliquely outwardly away from each other and the major axis returning to a position adjacent their respective outer edge of the path.

Referring to FIG. 6 the coil 100 has a major axis 102 with a first run 104 disposed on one side and a second run 106 disposed on the other side. Portions 108 are disposed adjacent the path edge while portions 110 are disposed adjacent the major axis. Portions 108, 110 are connected by oblique portions 112. The configuration of FIG. 6 may be utilized when it is desired to initiate sealing of a container finish at the central portion of the laminate and then sealing the laminate from the central portion outwardly to the outer edges.

In the coil of FIG. 6 the first and second runs thus each start adjacent the major axis and continue obliquely outwardly away from each other to a position adjacent their respective outer edges of the path. The first and second runs then continue from their outermost position obliquely inwardly toward each other and the major axis until the major axis is under effective electromagnetic influence.

Referring to FIG. 7 there is illustrated a coil 120 having a major axis 122 with a first run 124 disposed on one side and a second run 126 disposed on the other side. Portions 128 are adjacent the path edges while portions 130 are adjacent the major axis 122. Oblique portions 132 connect portions 128 and 130. The configuration of FIG. 7 may be utilized to effect a seal in a sweeping motion across the laminate.

In the coil of FIG. 7 one of the first and second runs starts adjacent the major axis and continues obliquely outwardly to a position adjacent its respective outer edge of the path. The other of the first and second run starts adjacent its respective outer edge of the path and continues obliquely inwardly to a position adjacent the major axis.

It is to be recognized that any of the coil configurations illustrated in FIGS. 3 through 6 may be turned end-for-end or that the containers may be passed adjacent thereto in the opposite linear direction.

In summary, the first and second runs of the layer-like coils described herein have conductor portion means positioned to permit electromagnetic inductive heating of the edges of the planar path defined by passage of the susceptor, and further conductor portion means positioned to permit electromagnetic inductive heating across the planar path. The latter conductor portion means includes the obliquely extending conductor portions and/or the conductor portions adjacent the major axis of the coils.

There has thus been disclosed apparatus for sealing wide-mouth containers by bonding across and to the container finish a closure member which includes means for conveying a container assembly, means for supplying inductive heating current, and an inductive heating coil connected to the current source and disposed adjacent the path of the container assembly. The container assembly includes a thermoplastic bonding material held in place between a closure member and the container finish in contacting relationship with both. The container assembly further includes a planar metallic susceptor disposed in conductive heating relationship with the bonding material so that current induced in the susceptor will conductively heat the bonding material.

In conclusion, it is pointed out that while the illustrated examples constitute preferred and practical embodiments of my invention, I do not limit myself to the exact details shown since modification of these details may be made without departing from the spirit and scope of the invention.

I claim:

1. An inductive heating coil for connection to a source of inductive heating current for heating a planar surface of a conductive material comprising
   a. a conductor shaped into a plurality of elongated turns forming a layer coil, one side of said layer defining a plane for disposition in inductive heating relationship adjacent and substantially parallel to a planar path defined by movement of a planar surface in a linear direction,
   b. the elongated turns of said layer having a major axis for disposition substantially parallel to the linear direction of movement of the planar surface in defining said planar path,
   c. said elongated turns including first and second runs extending generally longitudinally on first and second sides of said major axis, respectively,
   d. one of said first and second runs having first conductor portion means positioned sufficiently close to said major axis of said layer to permit the exercise of effective electromagnetic influence when current is passing therethrough on said planar path adjacent the major axis but not on the outer edges of said planar path,
   e. another of said first and second runs having second conductor portion means spaced from the major axis of said layer to permit the exercise of effective electromagnetic influence when current is passing therethrough on at least one outside edge of said planar path but not on that part of said planar path adjacent the major axis of said layer,
   f. said first and second conductor portion means of said first and second runs being connected by third conductor portion means extending generally obliquely across said layer with respect to said major axis to permit the exercise of effective electromagnetic influence in response to current flow therethrough generally obliquely across said planar path between the outside edges of said planar path, whereby effective magnetic influence is shifted transversely across a planar surface moving through said planar path to effectively heat the entire planar surface.

2. An inductive heating coil as defined in claim 1 which further includes
   a. said plurality of turns of said conductor following substantially the same configuration in said layer, and
   b. a split, single turn metallic sheath secondary extending around and in the same configuration as said turns of said conductor and on the side of said layer to be located adjacent said path,
   c. said single turn secondary being electrically and mechanically secured to one of said plurality of turns.

3. An inductive heating coil for connection to a source of inductive heating current for heating a planar surface of a conductive material, comprising
   a. a conductor shaped into a plurality of elongated turns forming a layer-like inductive heating coil;
   b. said elongated layer-like heating coil having longitudinally extending first and second runs of said turns, at least one of said runs being disposed in inductive heating relationship in a plane adjacent and substantially parallel to a planar path defined by movement of a planar surface to be heated, and means for connecting said first and second runs to enable flow of inductive heating current therethrough;
   c. said first and second runs having first conductor portion means positioned in said plane to permit electromagnetic inductive heating of the edges of said planar path, but not the part of said planar path between the edges thereof;
   d. said first and second runs having second conductor portion means positioned in said plane to permit electromagnetic inductive heating across the planar path but not at both edges of the path at the same time;
   e. said second conductor portion means extending obliquely with respect to the planar path across the plane parallel to the planar path so that electromagnetic inductive heating is permitted across the entire width of said planar path between said edges;
   f. said first and said second conductor portion means being connected to enable flow of inductive heating current therethrough and in said first and second runs, thereby enabling the heating of the entire surface of said planar surface passed along said planar path.

4. An inductive heating coil as defined in claim 3 in which
   a. said first run of said coil comprises one part starting adjacent one outside edge of said planar path and includes at least one excursion obliquely toward and then away from said major axis, and a second part which extends linearly adjacent said one outside edge, and in which
   b. said second run of said coil comprises one part opposite said one part of said first run which extends linearly adjacent the other outside edge of said planar path, and a second part opposite said second part of said first run starting adjacent said other outside edge and includes at least one excursion obliquely toward and then away from said major axis.

5. An inductive heating coil as defined in claim 4 in which said first and second runs each further include linearly extending sections adjacent said major axis connecting the inner reaches of each excursion.

6. An inductive heating coil as defined in claim 3 in which said first and second runs of said coil each start adjacent their respective outside edge of said path and continue obliquely inwardly toward each other and said major axis until the major axis is under effective magnetic influence when current flows through said runs.

7. An inductive heating coil as defined in claim 6 in which said first and second runs continue from their innermost position obliquely outwardly away from each other and said major axis returning to a position adjacent their respective outer edge of said path.

8. An inductive heating coil as defined in claim 3 in which said first and second runs of said coil each start adjacent said major axis and continue obliquely outwardly away from each other to a position adjacent their respective outer edge of said path.

9. An inductive heating coil as defined in claim 8 in which said first and second runs continue from their outermost position obliquely inwardly toward each other and said major axis until the major axis is under effective magnetic influence when current flows through said runs.

10. An inductive heating coil as defined in claim 3 in which
   a. one of said first and second runs of said coil starts adjacent said major axis and continues obliquely outwardly to a position adjacent its respective outer edge of said path, and in which
   b. the other of said first and second runs of said coil starts adjacent its respective outer edge of said path and continues obliquely inwardly to a position adjacent said major axis.

11. Apparatus for sealing wide-mouth containers by bonding across and to the container finish a closure member, comprising
   a. means for conveying a container assembly having a thermoplastic bonding material held in place between a closure member and the container finish, and a substantially planar metallic susceptor disposed in conductive heating relationship with the bonding material, in a direction so that the movement of said planar susceptor defines a substantially planar path;
   b. a conductor formed into an elongated turn as an inductive heating coil, said coil having means for connecting inductive heating current thereto;
   c. said elongated heating coil having longitudinally extending first and second runs, at least one of said runs being disposed in inductive heating relationship in a plane adjacent and substantially parallel to said planar path defined by movement of said planar surface to be heated, and means for connecting said first and second runs to enable flow of inductive heating current therethrough;
   d. said turn having first conductor portion means positioned in said plane to permit electromagnetic inductive heating of the edges of said planar path, but not the part of said planar path between the edges thereof;
   e. said turn also having second conductor portion means positioned in said plane to permit electromagnetic inductive heating across the planar path but not at the edges of said planar path;
   f. said second conductor portion means extending obliquely with respect to the planar path across the plane parallel to the planar path so that electromagnetic inductive heating is permitted across the entire width of said planar path between said edges;
   g. said first and said second conductor portion means being connected to enable flow of inductive heating current therethrough and in said first and second runs, thereby enabling the heating of the entire surface of said planar surface passed along said planar path.

12. Apparatus as defined in claim 11 in which
   a. said first run of said coil comprises one part starting adjacent one outside edge of said planar path and includes at least one excursion obliquely toward and then away from said major axis, and a second part which extends linearly adjacent said one outside edge, and in which
   b. said second run of said coil comprises one part opposite said one part of said first run which extends linearly adjacent the other outside edge of said planar path, and a second part opposite said second part of said first run starting adjacent said other outside edge and includes at least one excursion obliquely toward and then away from said major axis.

13. Apparatus as defined in claim 12 in which said first and second runs each further include linearly extending sections adjacent said major axis connecting the inner reaches of each excursion.

14. Apparatus as defined in claim 11 in which said first and second runs of said coil each start adjacent their respective outside edge of said path and continue obliquely inwardly toward each other and said major axis until the major axis is under effective magnetic influence when current flows through said runs.

15. Apparatus as defined in claim 14 in which said first and second runs continue from their innermost position obliquely outwardly away from each other and said major axis returning to a position adjacent their respective outer edge of said path.

16. Apparatus as defined in claim 11 in which said first and second runs of said coil each start adjacent said major axis and continue obliquely outwardly away from each other to a position adjacent their respective outer edge of said path.

17. Apparatus as defined in claim 16 in which said first and second runs continue from their outermost position obliquely inwardly toward each other and said major axis until the major axis is under effective magnetic influence when current flows through said runs.

18. Apparatus as defined in claim 11 in which
   a. one of said first and second runs of said coil starts adjacent said major axis and continues obliquely outwardly to a position adjacent its respective outer edge of said path, and in which
   b. the other of said first and second runs of said coil starts adjacent its respective outer edge of said path and continues obliquely inwardly to a position adjacent said major axis.

19. Apparatus as defined in claim 11 in which a. the closure member is in the form of a laminated disc coated with the thermoplastic bonding material at least on its interface with the container finish, and which further includes metallic foil as the susceptor as a laminate at least in the area of the disc adjacent the thermoplastic bonding material, and which further includes b. current supplying means for supplying a magnitude and frequency of inductive heating current that cooperates with the number of turns in said coil to activate the bonding material by heating said susceptor without damaging the laminated disc or the container finish.

* * * * *